(12) United States Patent
Moroney et al.

(10) Patent No.: US 12,058,406 B2
(45) Date of Patent: Aug. 6, 2024

(54) BROADCAST DELIVERED HLS SYSTEM

(71) Applicant: ARRIS Enterprises LLC, Suwanee, GA (US)

(72) Inventors: Paul Moroney, La Jolla, CA (US); Thomas L Du Breuil, Ivyland, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 965 days.

(21) Appl. No.: 16/410,403

(22) Filed: May 13, 2019

(65) Prior Publication Data

US 2019/0364330 A1 Nov. 28, 2019

Related U.S. Application Data

(60) Provisional application No. 62/670,332, filed on May 11, 2018.

(51) Int. Cl.
*H04N 21/436* (2011.01)
*H04L 9/08* (2006.01)
(Continued)

(52) U.S. Cl.
CPC ..... *H04N 21/43615* (2013.01); *H04L 9/0819* (2013.01); *H04N 21/2347* (2013.01);
(Continued)

(58) Field of Classification Search
CPC ........... H04N 21/631; H04N 21/44004; H04N 21/8543; H04N 21/4363; H04N 21/8456;
(Continued)

(56) References Cited

U.S. PATENT DOCUMENTS 6,449,719 B1 * 9/2002 Baker ................. H04L 63/0428
348/E7.056
8,140,699 B2 * 3/2012 Pickens .................... B44C 1/10
709/231

(Continued)

FOREIGN PATENT DOCUMENTS

EP 3001690 A1 3/2016
WO 2014/026988 A1 2/2014

OTHER PUBLICATIONS

PCT International Search Report & Written Opinion, Re: Application No. PCT/US2019/032001, dated Jul. 3, 2019.

*Primary Examiner* — Nasser M Goodarzi
(74) *Attorney, Agent, or Firm* — Chernoff, Vilhauer, McClung & Stenzel, LLP

(57) ABSTRACT

A method is provided that broadcasts channels to set top boxes (STB), processes them, and makes them available in ABR streaming format to clients in a home network. The method includes the steps of: transmitting a plurality of streams for each channel broadcast, wherein each stream is at a different bitrate and is segmentable into chunks; receiving the plurality of streams for one or more channels at the STB; and storing a plurality of segmentable chunk durations for each of the plurality of streams for each channel received. In some embodiments, HLS is packaged as MPEG transport without a manifest file, and a set top box (STB) caches HLS chunks for at least the consumer's most viewed channels, reducing acquisition time of those HLS streams. The STB reconstitutes the HLS playlist and chunks for delivery throughout the home.

20 Claims, 9 Drawing Sheets

(51) Int. Cl.
  *H04N 21/2347* (2011.01)
  *H04N 21/238* (2011.01)
  *H04N 21/262* (2011.01)
  *H04N 21/266* (2011.01)
  *H04N 21/433* (2011.01)
  *H04N 21/6334* (2011.01)
  *H04N 21/845* (2011.01)

(52) U.S. Cl.
  CPC ..... *H04N 21/238* (2013.01); *H04N 21/26258* (2013.01); *H04N 21/26613* (2013.01); *H04N 21/433* (2013.01); *H04N 21/63345* (2013.01); *H04N 21/8456* (2013.01)

(58) Field of Classification Search
  CPC ....... H04N 21/26613; H04N 21/63345; H04N 21/2347; H04N 21/26258; H04N 21/433; H04N 21/238; H04N 21/43615; H04N 21/0819
  See application file for complete search history.

(56) References Cited

U.S. PATENT DOCUMENTS

| Patent/Pub No. | Date | Name | Class |
|---|---|---|---|
| 8,181,262 B2* | 5/2012 | Cooper | H04L 9/3263 726/28 |
| 10,419,790 B2* | 9/2019 | Gersten | H04N 21/454 |
| 10,708,667 B1* | 7/2020 | Waggoner | H04L 65/4084 |
| 10,771,855 B1* | 9/2020 | Joliveau | H04N 21/4424 |
| 2008/0250465 A1* | 10/2008 | Kim | H04N 21/25891 725/87 |
| 2012/0216038 A1* | 8/2012 | Chen | H04N 21/44231 713/168 |
| 2013/0091297 A1* | 4/2013 | Minder | H04L 65/80 709/231 |
| 2014/0013376 A1* | 1/2014 | Xu | H04N 21/26258 725/116 |
| 2014/0123202 A1* | 5/2014 | Gautier | H04N 21/231 725/115 |
| 2014/0223502 A1* | 8/2014 | Doblmaier | H04N 21/25866 725/93 |
| 2014/0237505 A1* | 8/2014 | Rothschild | H04N 21/23113 725/31 |
| 2014/0282790 A1* | 9/2014 | Stephens | H04N 21/4532 725/116 |
| 2014/0331247 A1* | 11/2014 | Mick, Jr. | H04N 21/25891 725/19 |
| 2014/0344443 A1* | 11/2014 | Macinnis | H04L 65/00 709/224 |
| 2014/0351385 A1* | 11/2014 | Li | H04L 67/02 709/219 |
| 2014/0359166 A1* | 12/2014 | Mamidwar | H04N 21/6587 709/246 |
| 2015/0181259 A1* | 6/2015 | Zhang | H04N 21/6118 725/62 |
| 2015/0181283 A1* | 6/2015 | Maciej | H04N 21/4408 725/31 |
| 2015/0281752 A1* | 10/2015 | Van Veldhuisen | H04N 21/8456 725/116 |
| 2015/0350704 A1* | 12/2015 | Horen | H04L 67/2842 725/95 |
| 2015/0382042 A1* | 12/2015 | Wagenaar | H04L 65/605 725/34 |
| 2016/0044078 A1* | 2/2016 | Hosur | H04L 65/602 709/219 |
| 2016/0088322 A1* | 3/2016 | Horev | H04N 21/23418 725/14 |
| 2016/0142750 A1* | 5/2016 | Huber | H04N 21/4302 725/116 |
| 2016/0192029 A1* | 6/2016 | Bergstrom | H04L 12/18 725/109 |
| 2016/0269801 A1* | 9/2016 | Harden | H04N 21/6405 |
| 2016/0294898 A1* | 10/2016 | Wheelock | H04L 65/602 |
| 2016/0335418 A1* | 11/2016 | Fan | H04N 21/6405 |
| 2017/0078681 A1* | 3/2017 | Coward | H04N 19/115 |
| 2017/0171577 A1* | 6/2017 | Kipp | H04N 21/242 |
| 2017/0302981 A1* | 10/2017 | Sethuraman | H04N 21/8456 |
| 2018/0027266 A1* | 1/2018 | Schmidt | H04N 21/236 725/116 |
| 2018/0184145 A1* | 6/2018 | Pichon | H04N 21/25808 |
| 2019/0149819 A1* | 5/2019 | Phillips | H04L 65/607 375/240.02 |

* cited by examiner

BROADCAST DELIVERED HLS SYSTEM

CROSS-REFERENCE TO RELATED APPLICATIONS

This application claims the benefit of priority to U.S. Patent Application No. 62/670,332, entitled "Broadcast Delivered HLS System," filed on May 11, 2018, which is hereby incorporated by reference in its entirety.

FIELD

This disclosure relates generally to the field of broadcast networks and more specifically to broadcasting content to a STB and providing a set of stored audio/video (AV) information directly to a client device within a home environment.

BACKGROUND

Traditional television and the Internet are both used to deliver audio/video (AV) content, such as entertainment and educational programs, to viewers. Television programming and other AV content is available not only from traditional sources like broadcast and cable television, but also from computers and mobile computing devices such as smart phones, tablets and portable computers. These retail devices may receive content via wired or wireless communications networks, in a home, business, or elsewhere.

Adaptive streaming, also known as adaptive bit rate (ABR) streaming, is a delivery method for streaming video and audio over Internet Protocol (IP). ABR streaming is conventionally based on a series of short Hypertext Transfer Protocol (HTTP) progressive downloads which is applicable to the delivery of both live and on demand content. Examples of ABR streaming protocols include HTTP Live Streaming (HLS), MPEG Dynamic Adaptive Streaming over HTTP (DASH), Microsoft Smooth Streaming, Adobe HTTP Dynamic Streaming (HDS), and the like. An ABR streaming client performs the media download as a series of very small files. The content is cut into many small segments (chunks) and encoded into the desired formats. A chunk is a small file containing a short video segment (typically 2 to 10 seconds) along with associated audio and other data. Adaptive streaming relies generally on the use of HTTP as the transport protocol for these video chunks; however, other protocols may be used as well (e.g., Real Time Messaging Protocol (RTMP) is used in HDS).

Playback is enabled by creating a playlist or manifest (the terms are used interchangeably in this disclosure) that includes a series of uniform resource identifiers (URIs). For example, a uniform resource locator (URL) is a species of URI. Each URI is usable by the client to request a single HTTP chunk. A server, such as an origin server, stores several chunk sizes for each segment in time. The client estimates the available bandwidth and requests the best chunk size using the appropriate URI. Since the client is controlling when the content is requested, this is seen as a client-pull mechanism, compared to traditional streaming where the server pushes the content. Using URIs to create the playlist enables very simple client devices using web browser-type interfaces.

Adaptive streaming was developed for video distribution over the Internet, and has long been used (e.g., by Internet video service providers such as Netflix, Hulu, YouTube, and the like) to stream AV (audio/video) content, such as video content embedded in a web site, to an ABR streaming client upon request. The ABR client receives the AV content for display to a user. In order to deal with unpredictable network performance characteristics typical of Internet use as well as differences in client player capabilities, ABR streaming includes the ability to switch between different encodings of the same content. These different encodings, or profiles, vary in bitrate, resolution, codec, etc. Thus, an ABR streaming client can choose an optimum profile based on its capabilities along with the currently available bandwidth between it and the content provider.

A number of Multichannel Video Programming Distributors (MVPDs), such as cable and broadband service providers who provide both cable and Internet services to subscribers, operate content delivery networks (CDNs) in which Internet Protocol (IP) is used for delivery of television programs (e.g., IPTV) over a digital packet-switched network. In some IPTV networks, adaptive bit rate streaming can be used for delivery of AV content, such as live or linear television programming and video on demand (VOD) content enabling these operators to offer an "over-the-top" (OTT) solution to their subscribers.

For traditional broadcast systems, such as direct broadcast satellite (DBS) systems, where the delivery of content to subscribers relies on satellites, or terrestrial broadcast television systems, content is delivered in a one-way manner. These networks are designed such that the content is broadcast or pushed to set top decoders and built-in decoders, and displayed on the attached TV. Sometimes, the primary set top in a home will also include an IP delivery path to other simpler set tops in the same home, enabling multi-TV support.

As an alternative, traditional broadcast satellite or terrestrial providers could set up a complete ABR, e.g., HLS or DASH, infrastructure and carry their channels that way in parallel to their regular broadcasting. This would require these providers to transcode their existing service offerings to a suitable ABR suite of profiles, then connect those to an ABR infrastructure including a CDN for Internet service. The ABR suite of profiles may typically have 3 to 6 or more variants of varying resolutions and bitrates. The costs for setting up this parallel network can be burdensome to such broadcasters, especially since CDNs and the two way IP connections needed to their subscriber homes would typically be purchased from third parties.

Systems and methods that allow traditional broadcast providers to enable OTT services directly to their subscribers via their set-top boxes (STBs), without the use, or minimal use, of third party IP providers would be highly desirable. Accordingly, such systems and methods are disclosed herein.

It should be noted that the methods described here are applicable to any systems that include broadcast capabilities such as fiber based telco providers, cable TV providers or terrestrial broadcasters. A cable TV provider, for example, could choose to use the systems and methods described herein, in conjunction with their two way IP network, to more efficiently deliver their most popular channels for OTT use while conserving the bandwidth of their IP network for other data applications as well as their more lightly used OTT channels.

SUMMARY

In accordance with one aspect of the invention, a method of broadcasting channels to set top boxes (STB) in a home network is provided. The method includes the steps of: transmitting a plurality of streams for each channel broadcast, wherein each stream is at a different bitrate and is segmentable into chunks; receiving the plurality of streams for one or more channels at the STB; and storing a plurality of segmentable chunk durations for each of the plurality of streams for each channel received.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

An example embodiment of the present invention and its potential advantages are best understood by referring to FIGS. 1-10 of the drawings, like numerals being used for like and corresponding parts of the various drawings. The FIGS. 1-10, discussed below, and the various embodiments used to describe the principles of the present disclosure are by way of illustration only and should not be construed in any way to limiting the scope of the disclosure. Those skilled in the art will understand the principles of the present disclosure may be implemented in any suitably arranged mobile communication device, server and clients.

Traditional direct broadcast satellite providers, such as DIRECTV, Echostar, and Shaw, have no direct way today to support content to IP connected ABR, e.g., DASH or HLS, receiver style consumer devices such as phones and tablets. Provided herein is a method that distributes a suite of ABR channels by satellite (or other broadcast medium) to a home gateway or set top with memory. The home gateway can buffer channels in advance, subject to memory limitations, constantly refreshing the cache so that anyone using an in-home consumer electronic device can access HLS chunks rapidly, and use the applicable ABR protocol between the gateway and the device.

Figure 1:
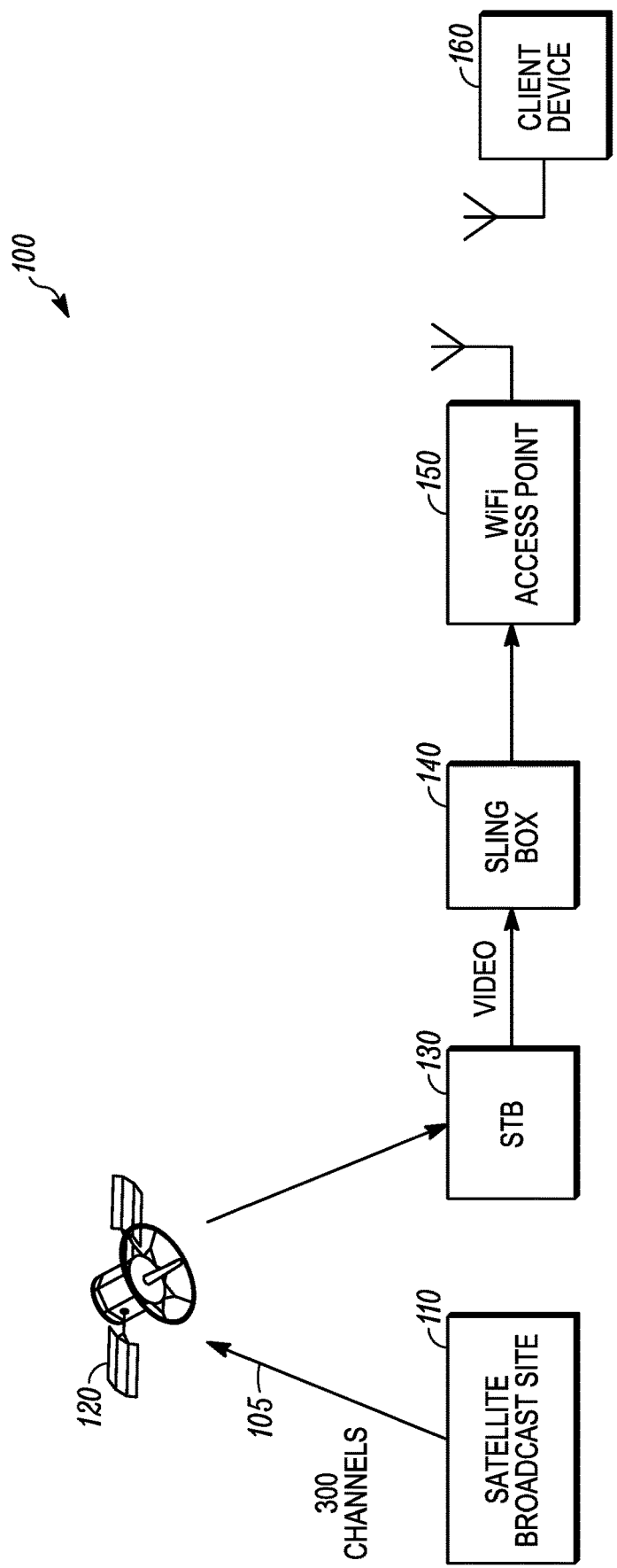
FIG. 1 is an overview of an existing broadcast satellite system that can be used for transmission of audio and/or video (AV) information including in-home delivery to ABR clients such as mobile phones.

FIG. 1 is a diagram depicting an alternative embodiment of a broadcast satellite system 100 that can be used for transmission and/or storage and retrieval of audio and/or video content, such as television (TV) programming. The broadcast satellite system 100 comprises a broadcast site or communication station 110, which provides audio-visual (AV) content 105 in the form of multichannel programming. As shown, AV content 105 is shown as 300 channels, but any number of channels may be provided. As an example, 200-400 channels may be provided. Such channels are typically provided at a predetermined and single resolution and approximate bit rate (e.g., broadcast site 110 uses MPEG2 transport format, at high rates and high quality). In some embodiments, communication station 110 transmits AV content 105 to a set-top box (STB) 130 via a satellite link with satellite 120.

As shown, STB 130 acquires the AV content from, e.g., 300 channels, provided from broadcast site or communication station 110. In some embodiments, STB 130 additionally transcodes the AV content from the received rate and quality to lower rates and quality, in support of the in-home streaming devices. This transcoding carries a cost, and the process is time consuming. Thus the consumer experience is not the same as with a full HLS infrastructure.

Also in system 100, assuming that the STB does not include its own transcoding, is a (purchased) Slingbox or other suitable media-streaming device 140 in communication with STB 130 and a Wi-Fi access point 150. In some embodiments, Slingbox 140 encodes analog AV content from STB 130 to the lower bitrate and quality that in-home CE devices can process. Using Wi-Fi access point 150, a retail client device 160 may access the AV content from Slingbox 140. As used herein a client device may be any retail device such as, but not limited to, an Android phone, iPhone, iPad, or other tablet, or laptop. In some embodiments, Slingbox 140 encodes AV content to rate match what it estimates the Wi-Fi network can carry from WiFi access point 150.

As an example, in order to watch a channel, a user tunes STB 130 first, and waits for it to acquire, then the Slingbox 140 encodes the output. Slingbox 140 works because an "analog hole" allows it to encode a received broadcast without violating any copy protection laws. So a user waits for the Slingbox 140 to encode the broadcast, then a Wi-Fi device such as client device 160, can access the Slingbox 140 signal through a Slingbox application or "app", if there is one available. This app may not be using HLS in the conventional way, or at all. Some Slingbox apps need to be purchased, and some are free. When the user is done, he has waited between about 7 and 12 seconds approximately for the signal he wishes to watch. As can be appreciated, although far less expensive for the operator than deploying an entire ABR streaming infrastructure, this approach is slow, requires custom apps, and the hardware is available from a very limited number of companies.

Figure 2:
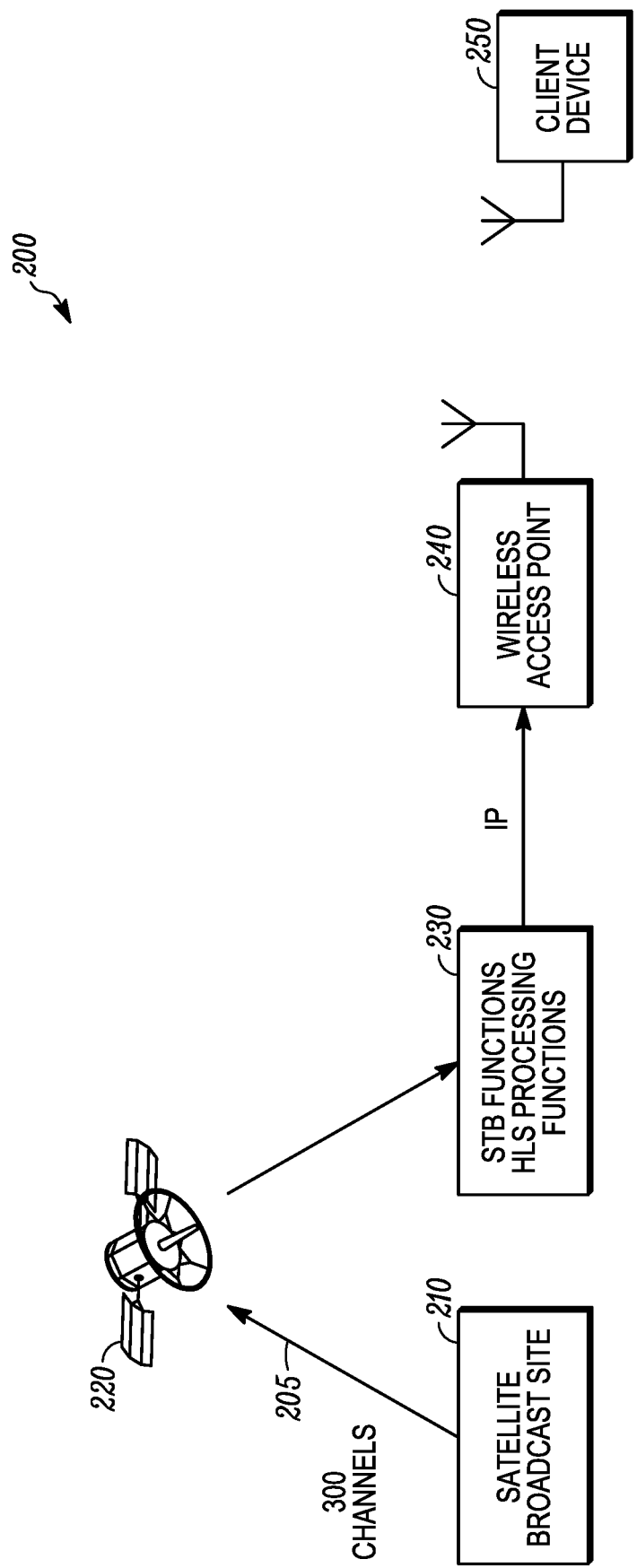
FIG. 2 is an overview of an illustrative broadcast satellite system that can be used for transmission of audio and/or video (AV) information, also enabling in-home delivery to ABR clients but with improved performance and lower subscriber cost than that shown in FIG. 1.

FIG. 2 is a diagram depicting an exemplary embodiment of a broadcast satellite system 200 that can be used for transmission and/or storage and retrieval of audio and/or video content, such as television (TV) programming. The broadcast satellite system 200 comprises a broadcast site or communication station 210, which provides audio-visual (AV) content 205 in the form of multichannel programming. Similar to FIG. 1, AV content 205 is shown as 300 channels, but any number of channels may be provided. Similarly, broadcast site 210 uses MPEG2 transport format, at high rates and high quality. However, in system 200, broadcast site 210 provides one or more versions of the channels in different bit rates. For example, broadcast site 210 may provide one to four versions of the same, or a subset of the, 300 channels at lower resolutions and bit rates. This may be achieved using transcoding equipment (not shown) at broadcast site 210 to produce these additional lower quality/bitrate encodings. This extra transcoder cost may be amortized over all subscribers using the service. In some embodiments, a lower number of streams than typical Internet-based ABR is provided, as a cost and satellite bandwidth saving measure.

In some embodiments, communication station 210 transmits AV content 205 to a server or set-top box (STB) 230 via a satellite link with satellite 220. For simplification, the three low rate transport streams for each of the channels in AV content 205 may be segmented into e.g., two-second chunks and aligned with MPEG-2 packet boundaries (e.g., by starting each chunk with an anchor frame, e.g. an IDR frame, in some cases the only IDR frame in the two seconds, and employing closed MPEG GOPs). This alignment can be signaled in the leading packet header of each two-second chunk, avoiding the need to provide some other way to indicate where chunk boundaries are. While described as two second chunks, other lengths may be used, with shorter sizes typically leading to shorter service acquisition time, and less memory in STB 230.

As shown, STB 230 acquires the AV content from all or a subset of the 300 channels provided from broadcast site or communication station 210. Further detail on the functioning of STB 230 is provided in FIG. 3. Also in system 200 is a wireless access point (e.g. Wi-Fi) 240 in communication with STB 230. Using wireless access point 240, a client device 250 may access the AV content from STB 230.

In some embodiments, ABR is packaged as MPEG transport stream(s) without an explicit manifest file sent from broadcast site 210, and then the STB 230 caches the ABR chunks for at least the consumer's most viewed channels, reducing acquisition time of those ABR streams. The STB 230 reconstitutes the HLS playlist and chunks and hosts them on an internal web server for delivery throughout the home.

Figure 3:
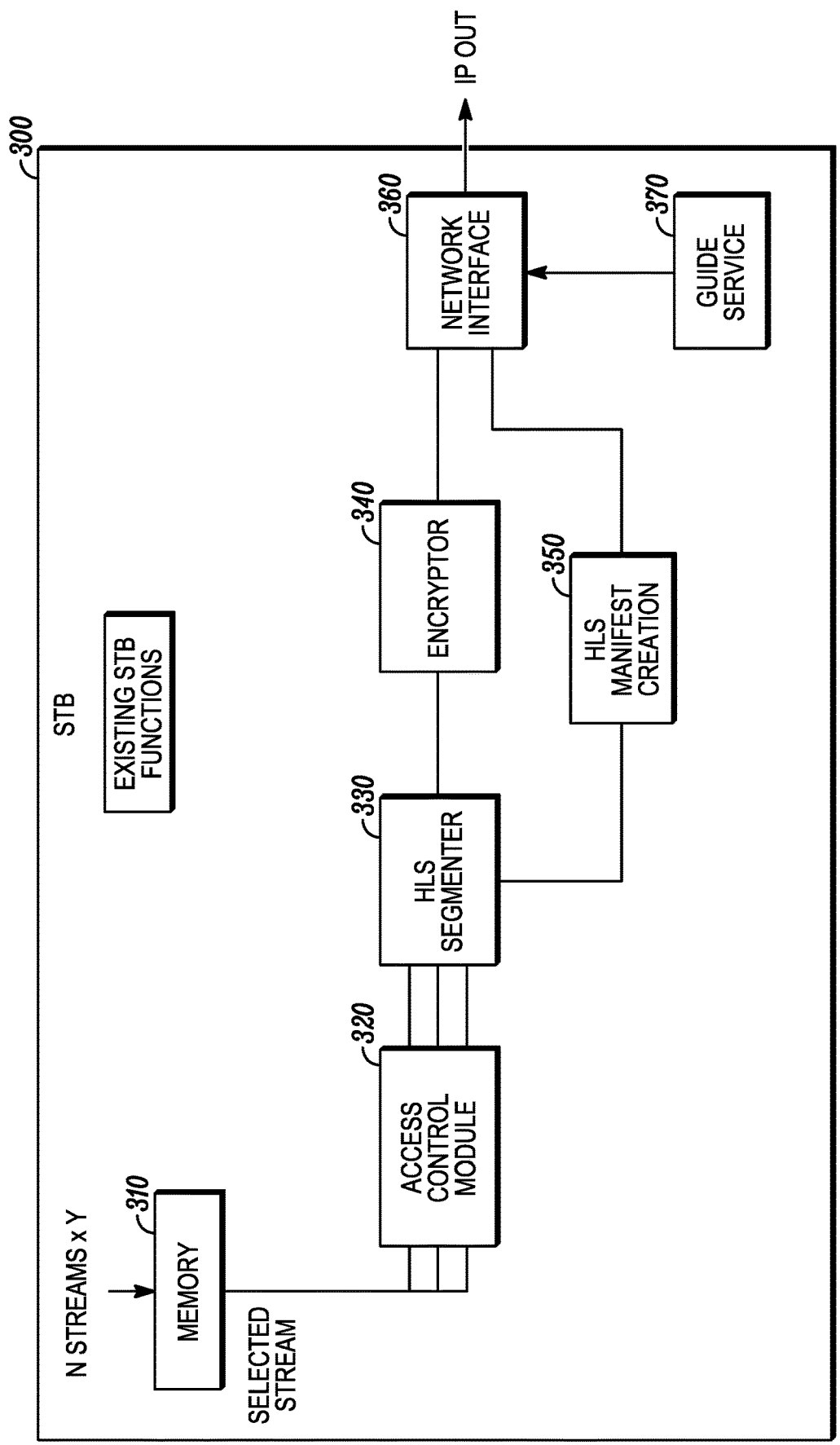
FIG. 3 illustrates a partial block diagram of an exemplary media streaming system or server in the home network.

FIG. 3 is a block diagram of a subsystem for implementing embodiments of the present disclosure. The system includes a set-top box (STB) 300. The STB 300 has the additional capability of streaming AV content or video assets stored in memory 310. The STB 300 also includes an access control module 320, an HLS segmenter module 330, an encryptor module 340, an HLS manifest creation module 350, a network interface module 360, and a guide service module 370.

In some embodiments, the AV content is received from a broadcast site or communication station (not shown) as a set of N×Y streams, where N represents the number of channels and Y is the number of different bit rates and resolutions (media profiles) of the N streams provided. In some embodiments, a satellite STB 300 can tune to as many channels N as the manufacturer wants to support, therefore a wide band tuner may include all channels, or a subset that most closely matches a consumers' interests or criteria may be supported. Such criteria may include the last N channels watched, genres he has indicated interest in, etc. These N channels can each have Y=3 or more different streams, with all N×Y streams saved in memory 310 for a short time.

In some embodiments, such as when supporting HLS, 3 chunks for each stream are (pre)stored in memory 310. It should be appreciated that fast acquisition of HLS streams can be done with 3 preexisting chunks of 2 seconds each. It is desirable to keep chunks small so that at least two chunks can be described in the playlist as soon as possible after stream start-up, as this helps provide a better experience in the event that the consumer chooses a channel not currently in memory. If the chunks are 2 seconds in duration, then this nominal storage is 6 seconds of video times N times Y streams. At some point, the total memory size required may be a major consideration.

Once a user or subscriber requests a channel from his client or mobile device (not shown), then the AV content can be pulled on-demand from memory 310 quickly, decrypted using an access control module 320 (such as the DIRECTV conditional access system), and segmented into actual HLS chunk files and provided with their associated manifest files via HLS segmenter 330 and manifest creation module 350. The segments are also encrypted for content protection within the home by encryptor 340. These are quick operations that do not take much processing or time. These segments and manifests are then effectively published to a small internal web server and network interface 360 and the client device can begin pulling the manifests and segments with its standard HLS player.

Note that in the case of terrestrial broadcast, broadcast content is not normally encrypted at all; thus access control module 320 would not be needed. Even in such a case, it is still often common to encrypt the HLS chunks for protection within the home with encryptor 340.

As is appreciated, in HLS, once the manifests are known, all the chunks by name are also known. HLS has two types of manifests, the single main manifest that identifies the various Y bitrate/resolution media profiles available (by URL), and the Y media playlists. So, a client first requests the main manifest, makes a decision about which variant it wants, then requests the associated media manifest. For 2 second segments, it reads and downloads the media playlist again approximately every 2 seconds to get the new segment information.

In typical satellite broadcast embodiments, a consumer can only access channels he has subscriptions for, since the same conditional access system and entitlement management process for the high rate broadcasts would be employed for the corresponding lower rate streams. This would allow the system to operate without additional management at the headend. However, if the service provider wished to charge separately for the privilege of receiving the low rate HLS streams, this can added/controlled within access control module 320 of the current STB system 300.

In some embodiments, encryptor 340 encrypts the segmented HLS chunk files, thereby protecting the interests of the content owner within the home. Because it is envisioned that the user is in his home environment, a time varying encryption key unique to the user may used irrespective of the chosen content. Thus, encryptor 340 may encrypt these chunk files with the user-dependent content key. It should be noted that HLS and DASH have a 'transport' mode, where chunk files are 2-second pieces of MPEG transport streams, as are broadcast files. This is the simplest approach; however, if desired, alternate modes could also be supported, such as fragmented MPEG4 chunks. This could be done for example with an encapsulation approach, at the headend, and decapsulation after access control decryption in the STB 300 (not shown).

In some embodiments, guide service module 370 interacts with the client app or browser on the mobile device that is making the channel selection for what to watch, e.g., it provides the information on the programs or channels currently available, possibly enhanced with links to further information on the Internet or operator's network, and when the user selects one from their mobile device, the guide service module 370 sends the URL for that channel back to the app on the mobile device, which the app then gives to the ABR media player that is integrated in the mobile device.

Although not specifically shown, the STB 300 further includes at least one processor and at least one memory for storing code that is executable by the processor to enable the STB 300 to perform processes according to embodiments of the present disclosure. The STB 300 further includes an interface 360 for transmission of the streaming HLS video assets, and the memory further stores code to enable the processor to control the interface to enable such transmission as well as to control the storage of N×Y streams in memory 310.

Figure 4:
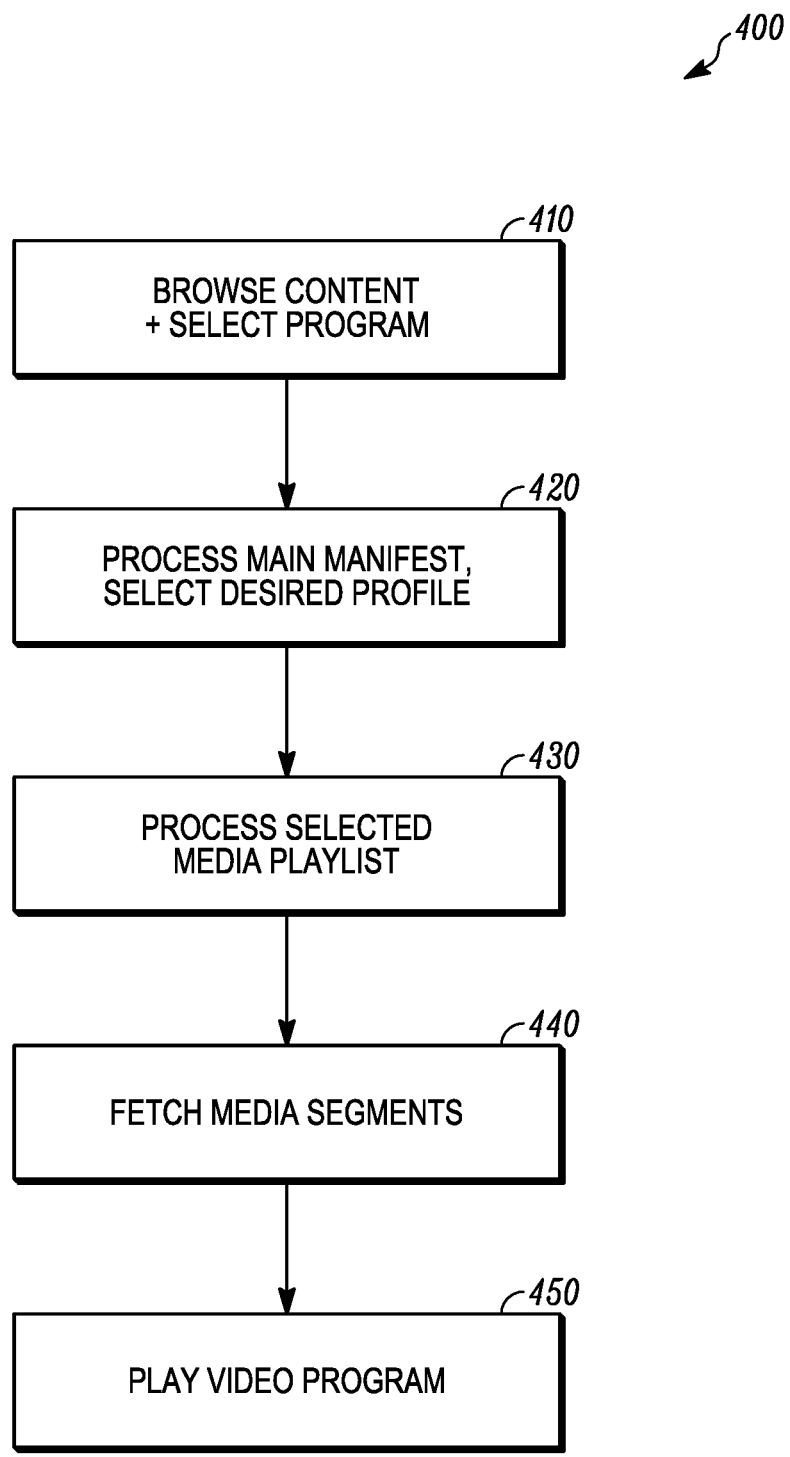
FIG. 4 illustrates a general flowchart for a process performed by a client device in the home network.

FIG. 4 illustrates a simplified flowchart for a process 400 performed by an ABR client device in the home network. At step 410, the consumer browses the available content, either via an application provided by their service provider or via a web browser. The consumer selects content for viewing (e.g., a channel).

At step 420, the client device downloads the main playlist file for that channel that describes the available profiles available to the client. The client decides which profile to select based on its estimate of network conditions as well as its capabilities.

At step 430, the client downloads the media playlist for the selected profile via the URL provided in the main playlist. The media playlist contains the list of media segments, or chunk files, currently available.

At step 440, the client device fetches the media segments advertised in the playlist, decrypts them, and then plays them in step 450.

The client fetches the media playlist 430 at approximately each media segment duration time in order to find the URL for the next new segment. The client also makes decisions as to whether it needs to switch to a different profile based on network conditions, and if so, selects a different profile from the main manifest downloaded in step 420, then continues with this new URL through the remaining steps. This process continues until the consumer either stops playing or decides to watch a different channel, in which case the process is started fresh from step 410.

In some embodiments, current security systems from current traditional broadcasters (e.g., DIRECTV) may be used to deliver content and provide conditional access to the STB. Once transformed to ABR format, that content would be solely encrypted for a home environment or network. In some embodiments, each home device is registered with the STB (often with a device ID or device MAC address and device "friendly name," the latter typically for user convenience and recognition). Typical in-home security systems could be DTLA's DTCP-IP, with the HLS extension defined in the document found at dtcp.com/documents/dtcp/info-20170609-dtcp-v1sk-hls-rev-1-0.pdf or the simpler HLS defined AES-128 exemplary scheme described in FIGS. 5 and 6.

Figure 5:
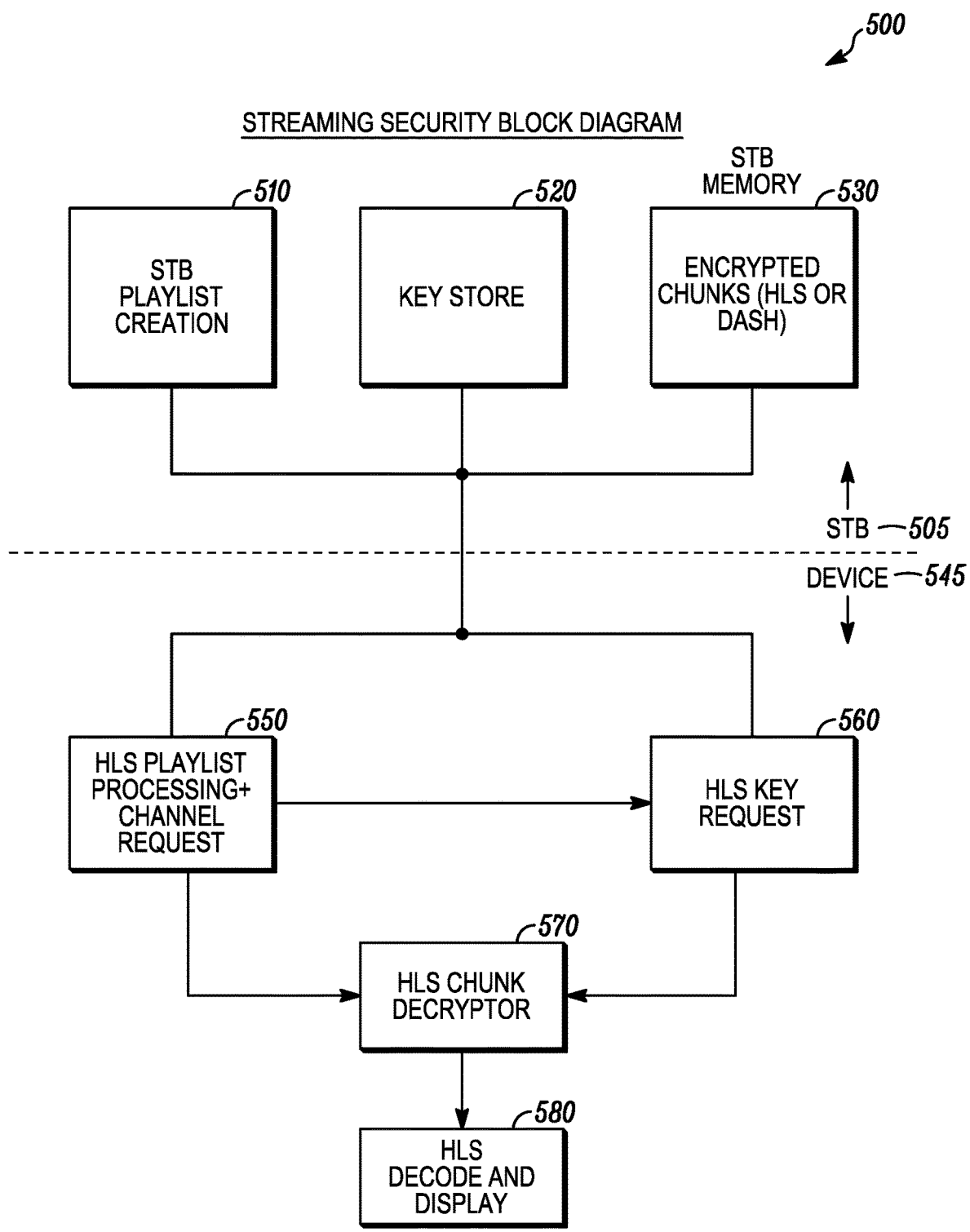
FIG. 5 illustrates a partial block diagram of an exemplary security system for FIGS. 3 and 4.

FIG. 5 illustrates a partial block diagram of an exemplary security system 500. Security system 500 includes a STB portion 505 and a client device portion 545. STB portion 505 includes STB playlist creation module 510, a key store module 520, and STB memory 530. Device portion 545 includes HLS playlist processing module 550, HLS key request module 560, HLS chunk decryptor module 570, and HLS decode and display module 580. The device portion 545 modules may comprise browser software or built-in application platform software or even application code if desired.

In some embodiments, the STB playlist creation module 510 is responsible for building the main playlist file, and the Y media playlists which name the current 3 chunks available to the clients, and the key or keys used to encrypt each. The format of these files matches either the HLS or DASH standard, for example. Every next chunk time, this file is recreated, adding one new chunk, and dropping off the oldest chunk. These files may be requested by client devices.

The STB key store 520 contains the key or keys used to encrypt each chunk. These keys may be requested by clients, for example. The STB memory module 530 may store the encrypted content chunks in a proper format, either HLS or DASH, for example. Each next chunk time, a new chunk is available in memory, and an old chunk can be discarded. These chunk files can be requested by client devices.

In some embodiments, HLS playlist processing module 550 downloads and processes the main playlist after channel selection. After selecting the appropriate media profile (bitrate and resolution), that media playlist can be downloaded and processed, and then the new content chunk file(s), approximately every chunk time. The Key request module 560 makes an https key request, and keys are returned in encrypted form.

The HLS chunk decryptor module 570 decrypts each content chunk in sequence with the downloaded keys. The decode and display module 580 presents the content to the consumer, both audio and video.

In some embodiments, the total number of home devices is limited, for example, up to 3. The user must explicitly identify those devices he wishes to use for streaming. Typically, this is done with a registration step, where the device requests inclusion in the home network for streaming, and the STB interacts with the user, typically with a Graphical User Interface (GUI) in the TV display, so that the user can accept the request. Thus no attacker can add himself from just outside the home. The user can further examine the "white" list of devices by ID and/or assigned friendly name at the STB GUI, and delete and confirm additions as he wishes.

Figure 6:
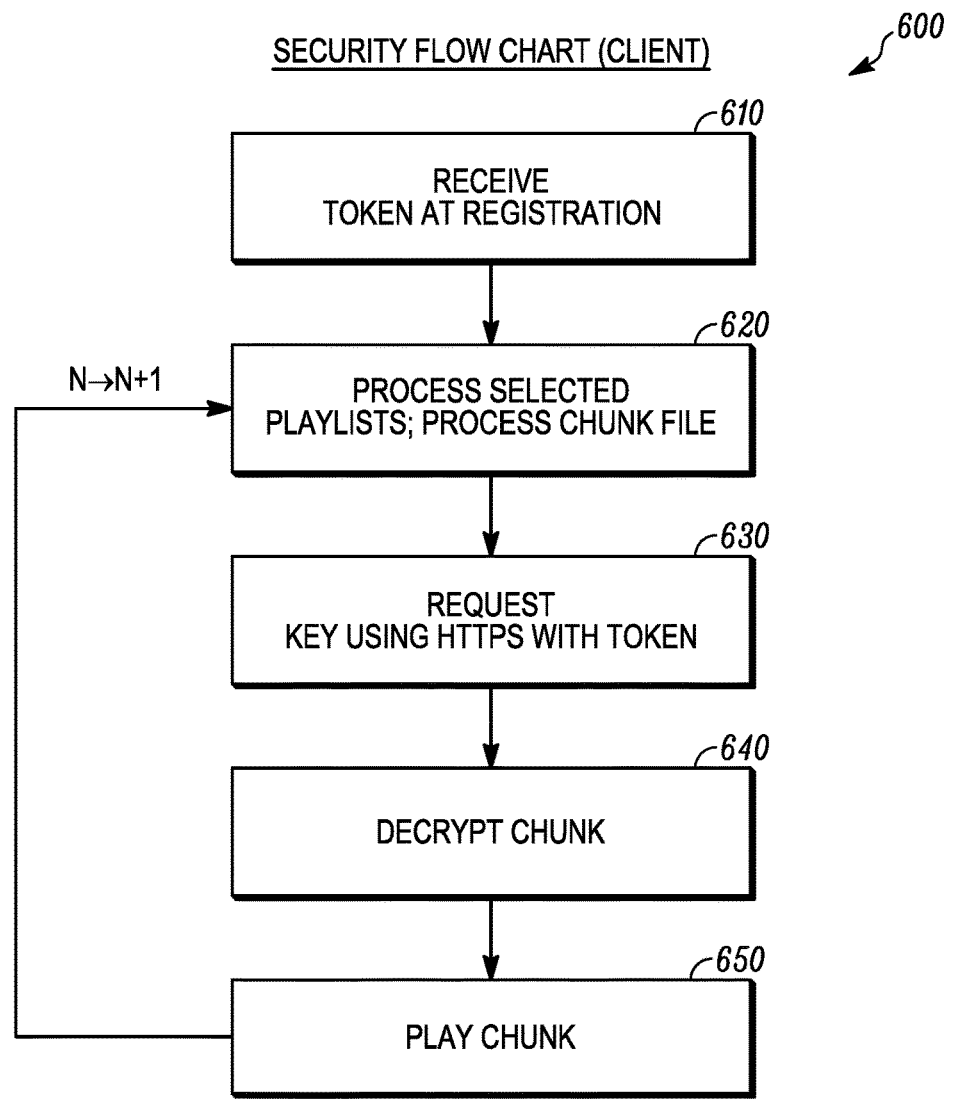
FIG. 6 illustrates a general flowchart for the security system of FIG. 5.

FIG. 6 illustrates a general flowchart 600 for the security system of FIG. 5. At step 610, the client receives a cryptographic token, for example, through the registration process. Registration may occur by opening a browser at the client, and selecting a registration option, or by trying to select content, and being redirected to a registration option, or through a custom application. Either way, the request for registration must be confirmed by the consumer at the STB display, as described above.

At step 620, some time afterwards, when the consumer selects content to view, the client processes the main playlist for the selected channel, and then the desired media profile playlist, which describes the current chunk files for video and audio, and the keys employed to encrypt them. The chunk files so identified are downloaded by the client device built-in software.

For each chunk, a key used to encrypt that chunk is requested from the STB with an https mutually authenticated TLS transaction employing the token at step 630. In this way, the STB knows that the request is valid, and which client device has requested it. Further, using the client token and a STB identity public key pair and certificate, like any modern Internet web browser, https keeps the key confidential in transit to the client device.

At step 640, the client decrypts each chunk, so that step 650 can decode and play the content. Each chunk time, the process repeats with a new media playlist, and so on.

Figure 7:
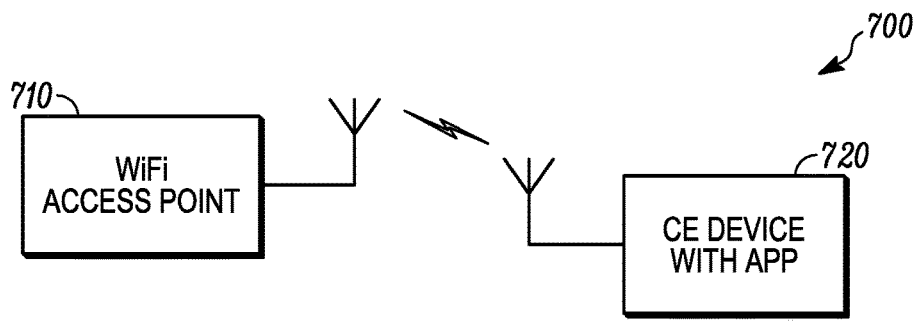
FIG. 7 illustrates a simplified block diagram of wireless communication in the home network.

Turning now to FIG. 7, STB 300 from FIG. 3 may include or be in communication with a Wi-Fi access point 710 as part of home wireless system 700. The AV content is processed and streamed in HLS chunks to external consumer electronic (CE) devices 720 such as a cell phone or a tablet (not shown) in a home network. In some embodiments, CE devices 720 include an application or "app" for the specialized viewing of a channel selection guide. A browser can suffice as described above, but the operator may wish to enhance the consumer experience with some form of custom application code, or perhaps include this ABR streaming within the custom application he already supplies to his consumers.

Figure 8:
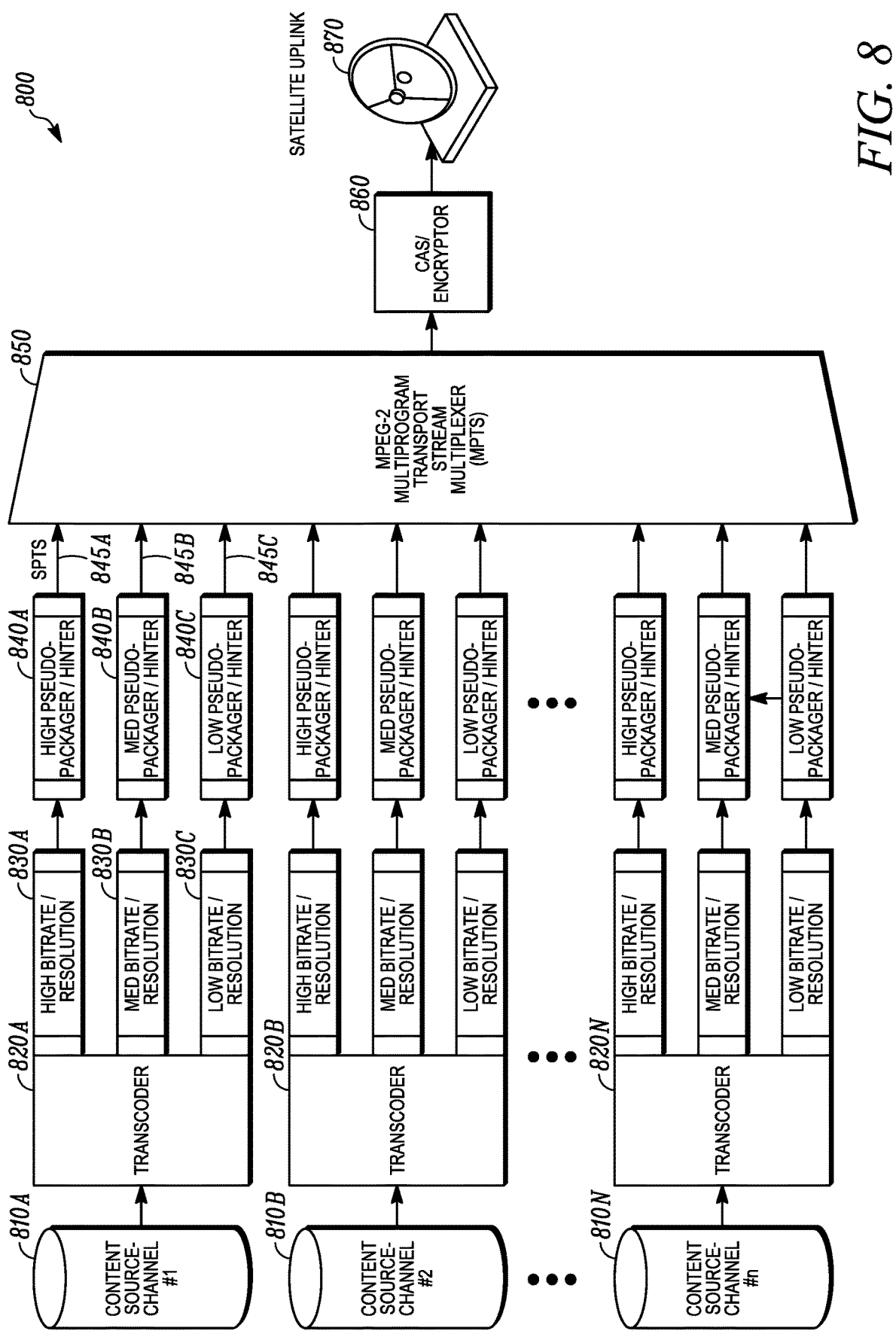
FIG. 8 illustrates a general flowchart for a method of processes performed by the broadcast satellite system.
Figure 9:
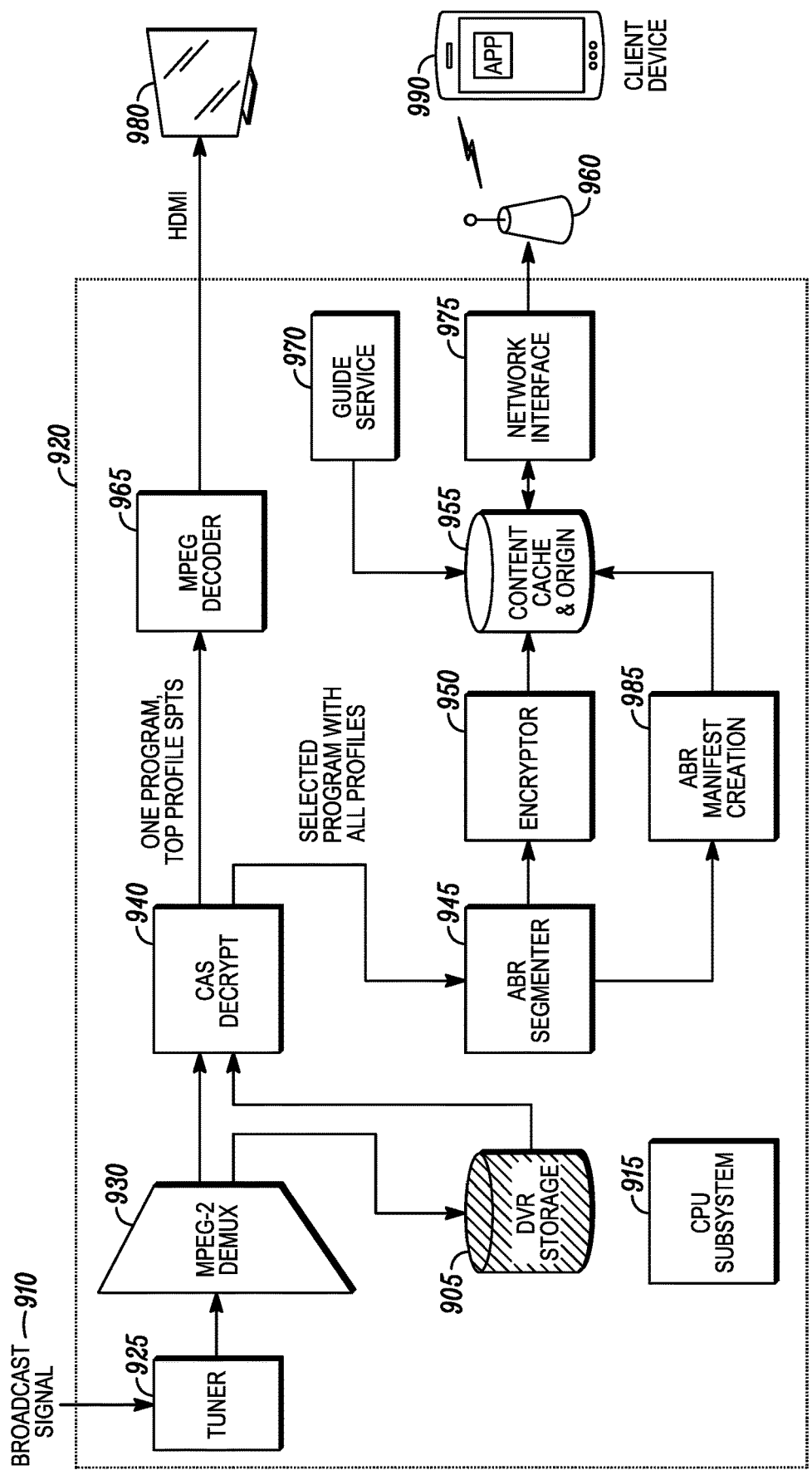
FIG. 9 illustrates a general flow diagram for a method of processes performed by the exemplary media streaming STB or server in the home network.

FIG. 8 and FIG. 9 illustrate more detailed flow charts for the satellite broadcast system and home server STB system. Referring first to FIG. 8, a flow diagram 800 for processing at a satellite uplink includes one or more content sources 810a, 810b, . . . , 810n. In some embodiments, each content source 810a, 810b, . . . , 810n, represent a different channel; content source 810a represents channel #1, content source 810b represents channel #2, and content source 810n represents channel #n. The broadcast satellite provider can opt to source from 1 to n channels, which may be the entire channel lineup or a subset of the channel lineup.

One or more content sources 810a, 810b, . . . , 810n are provided to a transcoder 820a, 820b, . . . , 820n, respectively. For simplification, a single transcoder 820a, and its resultant outputs will be discussed; however, it should be appreciated that similar outputs are produced by transcoders 820b through 820n. At transcoder 820a, channel #1 is encoded in e.g. 3 or more qualities/bitrates, such as a high quality/bitrate 830a, which in some embodiments can be used by existing subscriber receivers. Additionally, two lower quality/bitrates 830b, 830c, may be encoded to better enable support for subscriber devices like phones connected in the home via Wi-Fi. While shown as two lower quality/bitrates 830b, 830c, a third lower quality/bitrate (not shown) may optionally also be encoded. In some embodiments, three lower quality/bitrates are encoded without high quality/bitrate 830a. In all cases, the transcoder 820a must insure that its outputs, 830a, 830b and 830c are aligned such that their anchor frames occur at the same location in each of the outputs, and there may be an anchor frame positioned as what will become the first frame of each segment that will be created by the ABR Segmenter 945 in the STB. There may be one or more additional anchor frames within these created segments. In some embodiments, since audio generally requires much less bandwidth than the associated video, it is transcoded once and shared across multiple video profiles in ABR thus saving resources. The system operator has the flexibility to use a single audio encoding with all of the video profiles associated with each channel, separate audio encodings for each video profile, or other combinations thereof, for example, two audio profiles, each associated with two of the four video profiles encoded for the channel.

The 3 encoded bitrates are provided to their respective pseudo-packagers, where high quality/bitrate 830a is provided to pseudo-packager 840a, and the two lower quality/bitrates 830b, 830c are provided to pseudo-packagers 840b, 840c. Pseudo-packagers 840a, 840b, 840c may each be a software application designed to convert MPEG-2 transport streams to HLS-compliant content (chunks) and associated playlist files, but instead of creating these chunks directly, they produce a set of instructions, or hints, that will be used by the ABR Segmenter 945 in the STB for this purpose. Hints can range from the signaling to indicate the segment boundaries, to providing details on each of the profile bitrates, codecs and other data needed for the actual ABR packaged manifest files, simplifying the manifest creation in the STB. The output of pseudo-packagers 840a, 840b, 840c for each stream is an MPEG single program transport stream (SPTS) 845a, 845b, 845c.

In some embodiments, each pseudo-packager 840a, 840b, 840c may include a hinting function that creates a private data stream passed along with the transport stream that can be used by the subscriber's enhanced STB receiver ABR segmenter (e.g., 945 in FIG. 9) In some embodiments, the hinting function provides instructions on where to split MPEG SPTS 845a, 845b, 845c to create segments and associated ABR manifest files needed by subscriber clients to play the ABR streams. In some embodiments, the private data streams are placed in the MPEG SPTS 845a, 845b, 845c as an auxiliary PID stream with private data or in an existing MPEG video stream related field for private data.

MPEG SPTS 845a, 845b, 845c are provided to a multiplexer 850, such as an MPEG-2 multiprogram transport stream (MPTS) multiplexer. The multiplexer 850 combines all the incoming single program transport streams into a single multi-program transport stream and provides that combined stream to the Conditional Access System (CAS)/Encryptor block 860. CAS/Encryptor 860 may be essentially unchanged from what the satellite provider is already using.

The encrypted multiplex can then be modulated for transmission over a single transponder of the satellite, combined with the other such signals at this facility, (not shown) and then transmitted through the satellite uplink 870.

Referring now to FIG. 9, a flow diagram 900 for processing at home server STB 920 includes an RF broadcast signal 910 input, a STB 920, television 980 and mobile phone 990. STB 920 includes a tuner 925, demultiplexer 930, CPU subsystem 915, memory 935, CAS/decryptor 940, ABR segmenter 945, encryptor 950, ABR manifest generator 985, content cache & origin 955, MPEG decoder 965, guide service 970, network interface 975, and wireless access point 960. An optional component, DVR storage 905, is also shown and may be included in STBs that include digital video recording (DVR) capability.

Broadcast signal input 910 is received by STB 920, and in some embodiments, tuner 925 is configured to select multiple MPTS muxes from input 910 covering a desired number of ABR services to be cached/offered. Demultiplexer 930 selects the desired set of video channels including the configured set of additional profiles and writes these to memory 935 that operates as a first-in, first-out (FIFO) storing approximately only the 3 most recent segment durations of each of the selected video channels with their associated profiles.

In some embodiments, the memory 935 may be configured to cache only a subset of the available profiles for a channel (e.g., if the top profile is a 4 k stream, this may not be cached as it might not be practical for ABR streaming in the home). Similarly, some embodiments may take advantage of either user configuration or observation over time of the actual channels viewed and actual client connections within the home, both client type as well as the available bandwidth of the connection to each client, to further refine a subset of the available profiles or a subset of the available channels to cache in memory. A further refinement might be to store only the applicable subset of available profiles on a per channel basis based on the in-home clients that watch that channel (e.g., a mobile phone via WiFi may only be able to usefully consume profiles up to 1080p24 via WiFi while an Apple TV could use the 4 k profile via its Ethernet connection). Similarly, a tablet used in a playroom to watch children's channels only that is farther away from the WiFi access point 960 might only support the one or two lower bitrate profiles. These refinements on the actual profiles cached in memory can be used to increase the number of channels available to cache if available memory is limited.

CAS/decryptor 940 is configured to decrypt the streams that are part of the ABR cached offering after channel selection by the consumer's client device.

ABR segmenter 945 may process the 3 bitrate SPTS streams for the selected channel into the appropriate ABR segments, e.g. HLS or DASH, using either the built-in MPEG IDR alignment markers, or possibly hinting information if sent along with those streams. The encryptor 950 encrypts the segments according to the specific HLS security approach, as discussed previously in FIGS. 5 and 6, and then stores these media segments on the local content cache 955. The ABR manifest generator 985 creates the main and media playlists and stores these on the local content cache 955, which typically also serves as an http origin server. In typical embodiments, this is performed for only the channel(s) currently being requested from clients such as smart phone 990. Network interface 975 provides the STB IP output.

Note that it is also possible to provide the segments and manifests in both HLS and DASH formats simultaneously, so that different client devices can choose the format best suited to their internal processing. This could be a single content channel in HLS format to one device, and DASH to another, or two different channels, one in each format.

In some embodiments, there is a service provider app on the CE device (e.g., mobile phone 990) that provides a user interface, exposing all the channels available, and when the subscriber selects one, the CE device invokes its ABR player, making http requests to the STB local content cache & origin 955, across the in-home Wi-Fi network (e.g., via Wi-Fi access point 960), pulling the ABR segments and playing them. In some embodiments, the channel selection process in the device app starts with access to the web guide provided by the STB at guide service 970, just as consumers today can select their router's web page for configuration.

In some embodiments, legacy receivers or STBs have a top path 975 through MPEG decoder 965 to television 980, and may also offer a way to send one or more additional SPTS to other STB receiver clients in the home for live linear or on-demand television viewing via Wi-Fi or similar.

Similar processing can be applied to enhanced set tops that have a Digital Video Recording (DVR) capability that enables the consumer to record programs for viewing at a time of their convenience in the future. In this case, the primary video encoding is stored in DVR storage 905 similar to existing DVR set tops, typically in the DVR storage 905, and in addition, all of the segmentable streams for the duration of the program are stored. At playback time, the stored segmentable streams are read from the DVR storage 905 and processed as shown in FIG. 9 from the CAS decrypt 940, local ABR segmenter 945, and encryptor 950 as the chunks are needed, and stored for a short time on the content cache & origin 955. Note that some DVR implementations perform CAS decrypt 940 followed by a local DVR encryption process prior to DVR storage 905; in this scenario, at playback time, the content would be read from DVR storage 905, passed through the local DVR decryption process instead of the CAS decrypt 940, and then follow the same processing through the local ABR segmenter 945, encryptor 950 as the chunks are needed, and stored on the content cache & origin 955. The manifest generator process 985 is modified in the DVR case to build a single complete media manifest of all the segments comprising the program as soon as the content is requested for playback.

Figure 10:
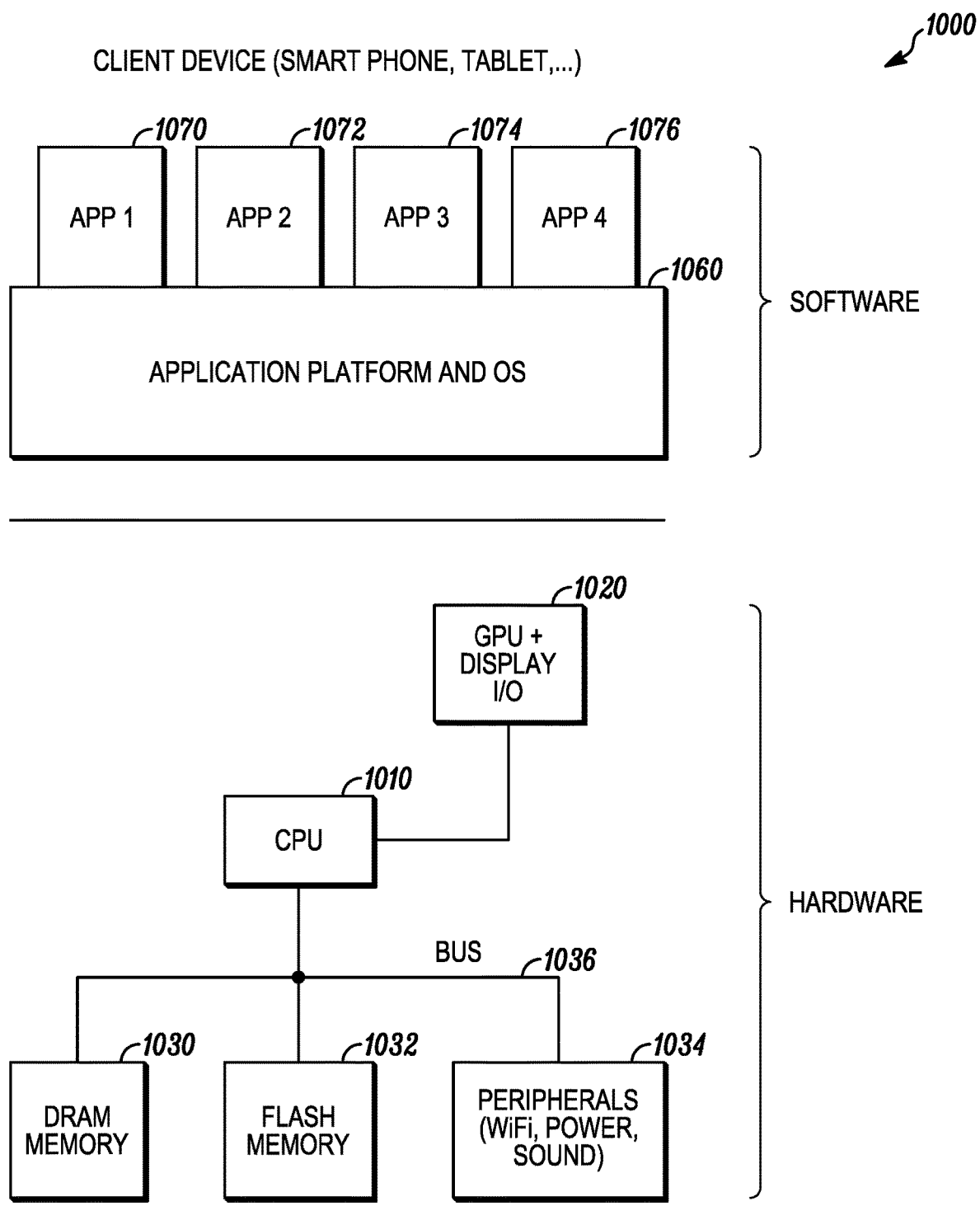
FIG. 10 illustrates a diagram of a computer system that can be used to implement elements of the client device in the disclosed system.

FIG. 10 is a diagram illustrating an exemplary computer system 1000 that could be used to implement elements of the client device of the present disclosure. The computer system 1000 includes a processing device such as a computer or central processing unit (CPU) 1010, which comprises a general purpose hardware processor and/or a special purpose hardware processor and memory, such as dynamic random access memory (DRAM) 1030 and FLASH memory 1032. The CPU 1010 may be coupled via BUS 1036 to other peripherals 1034 such as WiFi, power, sound, etc. The graphics processor (CPU) and display input/output (I/O) 1020 are also coupled to the CPU typically through another connection.

In one embodiment, the device operates by the CPU 1010 performing instructions defined by a computer program under control of an operating system. The computer program and/or the operating system may be stored in the memory 1030 or 1032 and may interface with the user and/or other devices to accept input and commands and, based on such input and commands and the instructions defined by the computer program and operating system, to provide output and results.

Output/results may be presented on the display 1020 or provided to another device for presentation or further processing or action. In one embodiment, the display 1020 comprises a crystal display (LCD) having a plurality of separately addressable pixels formed by liquid crystals. Each pixel of the display 1020 changes to an opaque or translucent state to form a part of the image on the display in response to the data or information generated by the CPU 1010. Other display 1020 types also include picture elements that change state in order to create the image presented on the display 1020. Although the term "computer" is referred to herein, it is understood that the computer may include portable devices such as cellphones, portable MP3 players, video game consoles, notebook computers, pocket computers, or any other device with suitable processing, communication, and input/output capability.

Also included in FIG. 10 are software functions. Smart phones and tablets are generally structured as application platforms, that is, platforms that can accommodate third party applications in a specific manner. In FIG. 10, application platform and OS 1060 may be the iOS platform from Apple, or the Android platform from Google, generally run on some form of the Linux OS. Various applications 1070, 1072, 1074, and 1076 for example can be either preinstalled with the device upon purchase, or downloaded from the application store by the consumer as he wishes at a later date. Examples of such applications are one or more web browsers, special operator provided applications in support of the overall consumer experience, and perhaps a specialized registration application.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine-readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

While the foregoing is directed to embodiments of the present invention, other and further embodiments of the invention may be devised without departing from the basic scope thereof, and the scope thereof is determined by the claims that follow.

What is claimed is:

1. A method of broadcasting at least one channel to set top boxes (STBs) located in a home network, the method comprising:
    transmitting to the STBs a plurality of streams for each at least one channel broadcast, wherein each stream comprises video displaying the content of its respectively associated channel and encoded at a different bitrate relative to other of said plurality of streams displaying the content of its respectively associated channel;
    transmitting instructions to the STB, the instructions usable by the STBs to segment each of the plurality of streams into sequential chunks suitable for delivery by the STBs of Adaptive Bitrate (ABR) content to client devices of the STBs.

2. The method of claim 1, wherein transmitting a plurality of streams at different bit rates for each channel includes at least two streams at lower bit rates.

3. The method of claim 2, wherein transmitting a plurality of streams at lower bit rates for each channel includes at least one stream at high bit rate and resolution.

4. The method of claim 1, wherein the instructions are usable by the STBs to segment the plurality of streams into chunks only for a subset of channels broadcast to the STB, the subset based on at least one of the last M channels requested through the STB or the M channels most frequently requested through the STB.

5. The method of claim 1, wherein the instructions are usable by the STBs to segment each of the plurality of streams into sequential chunks each starting with an anchor frame aligned in time across the plurality of streams for each channel and so that each chunk has a time duration within a predetermined range.

6. The method of claim 5, wherein the predetermined range spans an interval between 0.5 and 12 seconds.

7. The method of claim 1, wherein the instructions include profile bitrates and other parameters to assist in creating manifest files required by the ABR protocol requested by the client devices.

8. The method of claim 1, further comprising encrypting the plurality of streams at different bit rates for each channel using traditional broadcast conditional access.

9. The method of claim 1, where the instructions are usable by the STBs to build a set of playlists according to one or more ABR formats.

10. The method of claim 9, wherein at least one ABR format is HLS.

11. The method of claim 9, wherein at least one ABR format is DASH.

12. The method of claim 1, wherein the plurality of streams for each channel include hint data in an MPEG program table descriptor that can be used by a client device for the creation of ABR playlists.

13. A method of broadcasting at least one channel from set top boxes (STBs) to client devices in a home network, the method comprising:
    receiving at the STBs a plurality of broadcast streams for each at least one channel, wherein each stream comprises video displaying the content of its respectively associated channel and encoded at a different bitrate relative to other of said plurality of streams displaying the content of its respectively associated channel;
    receiving at the STB instructions usable by the STBs to segment each of the plurality of streams into sequential chunks suitable for delivery of Adaptive Bitrate (ABR) content to client devices of the STBs;
    using the instructions to segment the plurality of streams into the sequential chunks; and
    delivering the sequential chunks associated with at least one of the plurality of streams to at least one of the client devices.

14. The method of claim 13 including encrypting the plurality of streams at different bit rates for each channel using traditional broadcast conditional access.

15. The method of claim 13 where the STB uses the instructions to segment the plurality of streams into chunks only for a subset of channels broadcast to the STB, the subset based on at least one of the last M channels requested through the STB or the M channels most frequently requested through the STB.

16. The method of claim 13 where, upon selection of a channel to view in the home network by a client device, the STB decrypts and processes the plurality of streams at different bit rates for the channel into a requested ABR chunk format.

17. The method of claim 13 further comprising building a set of playlists according to one or more ABR formats.

18. The method of claim 13 further comprising encrypting the ABR chunks, and implementing a key management system to provide encryption keys or key material to client devices.

19. The method of claim 13 where the STB is configured to act as a server for the playlists, media segments, and key related files to client devices in the home network.

20. The method of claim 19 where the STB stores the plurality of sequential chinks at a time prior to a client device requesting access to a stream at a bit rate for a channel.

* * * * *